(12) United States Patent
Snowball

(10) Patent No.: US 9,654,666 B1
(45) Date of Patent: May 16, 2017

(54) DIRECT SCAN TO PACKAGE PRINTING

(71) Applicant: Xerox Corporation, Norwalk, CT (US)

(72) Inventor: David Snowball, Sandy (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/945,517

(22) Filed: Nov. 19, 2015

(51) Int. Cl.
| | |
|---|---|
| G06K 15/02 | (2006.01) |
| H04N 1/393 | (2006.01) |
| H04N 1/00 | (2006.01) |
| H04N 1/387 | (2006.01) |
| H04N 1/04 | (2006.01) |

(52) U.S. Cl.
CPC .......... *H04N 1/393* (2013.01); *G06K 15/021* (2013.01); *H04N 1/00456* (2013.01); *H04N 1/04* (2013.01); *H04N 1/3877* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 6,102,536 A | 8/2000 | Jennel | |
| 6,117,061 A | 9/2000 | Popat et al. | |
| 6,689,035 B1 | 2/2004 | Gerber | |
| 7,366,643 B2 | 4/2008 | Verdura et al. | |
| 7,599,088 B2 | 10/2009 | Bru | |
| 7,765,469 B2 | 7/2010 | Sembower et al. | |
| 8,219,227 B2 | 7/2012 | Paltiel et al. | |
| 8,570,590 B2 | 10/2013 | Redmer | |
| 8,775,130 B2 | 7/2014 | Walker et al. | |
| 8,994,734 B2 | 3/2015 | Morgana et al. | |
| 9,032,872 B2 | 5/2015 | Uptergrove | |
| 9,132,935 B2 | 9/2015 | Carroll | |
| 9,158,875 B2 | 10/2015 | Morgana et al. | |
| 2003/0035138 A1 | 2/2003 | Schilling | |
| 2005/0050052 A1 | 3/2005 | Zimmerman et al. | |
| 2009/0287632 A1* | 11/2009 | Gombert | G06N 5/02 706/55 |
| 2011/0157646 A1* | 6/2011 | Tsugimura | H04N 1/00222 358/1.15 |
| 2012/0291647 A1 | 11/2012 | Green | |

(Continued)

OTHER PUBLICATIONS www.packmage.com. Accessed Nov. 17, 2015.
www.thepaperworker.com. Accessed Nov. 17, 2015.

*Primary Examiner* — Henok A Shiferaw
(74) *Attorney, Agent, or Firm* — Gibb & Riley, LLC

(57) ABSTRACT

Various methods and devices display a sheet scanning order on a user interface. The sheet scanning order identifies a corresponding panel of a foldable media for each position in the sheet scanning order. The foldable media has multiple panels per side. The foldable media receives printing while unfolded, and the foldable media is folded into a three-dimensional shape after printing. These methods and devices scan sheets in the sheet scanning order to generate scanned images using a scanner. Also, such methods and devices automatically arrange and orient the scanned images to cause a printing engine to print the scanned images on corresponding panels according to the sheet scanning order (using a processor). Such methods and devices print the scanned images on corresponding panels of the foldable media according to the sheet scanning order, using the printing engine.

16 Claims, 9 Drawing Sheets

(56) References Cited

U.S. PATENT DOCUMENTS

2012/0311905 A1* 12/2012 Dodd ................... B42D 15/008
                                                                40/798
2013/0120770 A1* 5/2013 Mandel ................. G06Q 10/10
                                                                358/1.9

* cited by examiner

DIRECT SCAN TO PACKAGE PRINTING

BACKGROUND

Systems and methods herein generally relate to printing on unfolded packages or containers and more particularly to scanning images printed on packages or containers.

Three-dimensional packages or containers (e.g., boxes, etc.) are usually formed by patterning a flat substrate (e.g., sheets of double-layer cardboard) into a specific shape with perforations and fold creases. These perforated, creased, and patterned flat substrates can then be folded and assembled into three-dimensional items to create the packages or containers.

Traditional container design applications allow users to create new container designs or use existing container designs. For example, most modern computers can run computer aided design (CAD) applications that allow designers to create container designs, modify existing container designs, etc. Such programs also allow the designer to select, arrange, size, and orient text and graphic images that will appear on various panels of the containers. These text, graphics, and images are printed on the unfolded (flat) perforated, creased, and patterned substrates prior to being folded.

SUMMARY

Apparatuses herein include, among other components, a processor, a printing engine, a scanner, and a user interface, etc., each operatively (meaning directly or indirectly) connected to the processor. The printing engine prints (places markings) on foldable media. The foldable media has multiple panels per side and receives the printing while unfolded, and the foldable media is later folded into a three-dimensional shape after being printed upon. The user interface displays a sheet scanning order that identifies a corresponding panel of the foldable media for each position in the sheet scanning order. The scanner scans the sheets (as arranged by the user in the sheet scanning order) to generate scanned images. The processor automatically arranges and orients the scanned images to cause the printing engine to print the scanned images on corresponding panels, according to the sheet scanning order.

While the foregoing apparatuses can be systems that include many separate devices, other apparatuses herein are stand-alone, self-contained printing and scanning apparatuses that can scan images and print such images directly on foldable media without using any other device or system (such as a package design program running on a separate computer, etc.).

Such stand-alone, self-contained apparatuses include (among other components) a processor and a printing engine within the body of the apparatus, a scanner and a user interface on the exterior of the apparatus (all of which can be operatively connected to the processor) etc. The printing engine prints on foldable media that has multiple panels per side. Again, such foldable media receives printing while unfolded, and the foldable media is later folded into a three-dimensional shape after printing.

The user interface displays a sheet scanning order that identifies a corresponding panel of the foldable media for each position in the sheet scanning order. For example, the user interface can display the sheet scanning order by providing text that explains which sheets will appear on specific panels, or by displaying the sheet scanning order on a graphic representation of the foldable media.

The scanner scans the sheets (as arranged by the user in the sheet scanning order) to generate scanned images. The processor automatically arranges and orients the scanned images to cause the printing engine to print the scanned images on corresponding panels of the foldable media according to the sheet scanning order. The processor can also automatically orient the scanned images to all have the same orientation when the foldable media is folded, and automatically adjust the size of the scanned images to match the size of a corresponding panel. The user interface can further display a menu for selection from different foldable media types, each of which comprises different panel positions corresponding to a specific sheet scanning order.

Various methods herein display a sheet scanning order on a user interface. The sheet scanning order identifies a corresponding panel of a foldable media for each position in the sheet scanning order. The foldable media has multiple panels per side. The foldable media receives printing while unfolded, and the foldable media is folded into a three-dimensional shape after printing. These methods scan sheets (as arranged by the user in the sheet scanning order) to generate scanned images, using a scanner. Also, such methods automatically arrange and orient the scanned images to cause a printing engine to print the scanned images on corresponding panels according to the sheet scanning order (using a processor). Such methods print the scanned images on corresponding panels of the foldable media according to the sheet scanning order, using the printing engine.

Additional methods herein can display a menu for selection from different foldable media types or patterns, on a user interface of a self-contained printing and scanning apparatus. Again, each of the foldable media types has different panel positions corresponding to a specific sheet scanning order. The foldable media has multiple panels per side. The foldable media receives printing while unfolded, and the foldable media is later folded into a three-dimensional shape after the printing.

Such methods display a sheet scanning order on a user interface of a self-contained printing and scanning apparatus to instruct the user how to have scanned sheets printed on panels of the foldable media. The sheet scanning order identifies the corresponding panel of the foldable media for each position in the sheet scanning order. For example, these methods can display the sheet scanning order by providing (on the user interface) text that explains which sheets will appear on specific panels, or by displaying (on the user interface) the sheet scanning order on a graphic representation of the foldable media (unfolded or folded). Such methods scan sheets (as arranged by the user in the sheet scanning order) to generate scanned images using a scanner of the self-contained printing and scanning apparatus.

Additionally, such methods automatically arrange and orient the scanned images to cause a printing engine of the self-contained printing and scanning apparatus to print the scanned images on corresponding panels according to the sheet scanning order (using a processor of the self-contained printing and scanning apparatus). When automatically arranging and orienting the scanned images, such methods can automatically adjust the size of the scanned images to match the size of a corresponding panel, and can automatically orient the scanned images to all have the same orientation when the foldable media is folded. Then, these methods print the scanned images on corresponding ones of the panels of the foldable media according to the sheet scanning order, using the printing engine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
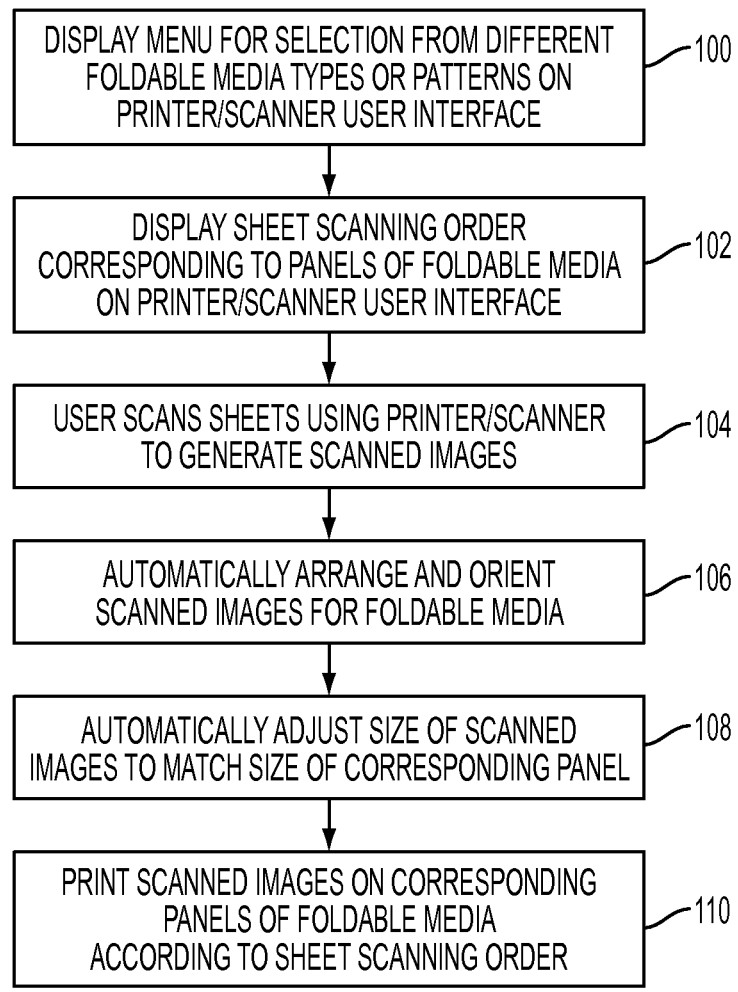
FIG. 1 is a flow diagram of various methods herein.

As mentioned above, applications running on computers allow designers to create container designs, modify existing container designs, etc., as well as arrange, size, and orient previously stored text and graphic images that will appear on various panels of the containers. The systems and methods herein improve upon such existing systems by eliminating the computer and container/packaging design application. Instead of requiring a user to use a container/packaging design application to select, arrange, size, and orient text and graphic images that will appear on various panels of foldable containers, the systems and methods herein merely inform the user that the order in which images are scanned into a scanner will determine the location of such images on existing previously designed foldable packaging substrates.

Thus, with the systems and methods herein, the user is informed of the scanning order for a foldable packaging substrate through a user interface (e.g., of the multi-function scanner/printer); the user scans images in the scanning order; and the scanner/printer prints the scanned images on the foldable packaging substrate. These methods allow the user to feed substrates into a stand-alone printer/scanner, and supply the images of that are to be printed on the different panels of the substrate to the scanner of the same stand-alone printer/scanner to produce printed foldable items without utilizing any other applications or computerized devices. This allows users to produce customized three-dimensional foldable items by interacting with a single device, and avoids the conventional step of requiring the user to first interact with a container design application running on a separate computerized device, to produce the same items.

Therefore, the systems and methods herein use a scan of previously printed sheets as the only source of images for the container. The methods and systems herein allow multiple images to be scanned and assigned to faces or panels of the packaging media; and obtain the images scanned using only the self-contained printing and scanning apparatus, before merging the scanned images to form the output container.

The printing (marking) operations can be similar to general standard print jobs and have similar parameters for defining output media size and type. The systems and methods described herein also provide several user-selectable parameters for output media size. For example, these systems and methods allow the user to select an option to build images for packaging, on the user interface of the self-contained printing and scanning apparatus. The user interface can display flat packaging with faces numbered 1-6, with each number corresponding to a distinct side of the packaging, (e.g. bottom, top, left side, etc). These systems and methods also display further parameters that can be individually selected for each side of the packaging, allowing the user to change media face dimensions, change scale factor, change original size, etc.

The systems and methods herein prompt the user to load and scan the original media in the order shown on the user interface, using the self-contained printing and scanning apparatus. After the original sheets have been scanned, the self-contained printing and scanning apparatus can merge the scanned images into a representation of the printed foldable media, which is displayed on the user interface. Thus, the systems and methods can also utilize a single scan job, instead of multiple individual single sheet scans. The single scan job can be used, for example, if the user has hardcopy artwork, artwork prototyping, personalized printing using customer images, or a customer demo to print on the packaging.

More specifically, the systems and methods herein provide a device that displays a sheet scanning order (corresponding to panels of foldable media) on a user interface. The sheet scanning order identifies a corresponding panel of foldable media for each position in the sheet scanning order. The foldable media has multiple panels per side, and printing may be performed only on one side of the foldable media sheet, or both sides. The foldable media receives printing while unfolded, and the foldable media is folded into a three-dimensional shape after printing.

As noted above, these methods and devices scan sheets in the sheet scanning order to generate scanned images using a scanner of the printer/scanner device. Also, such methods and devices automatically arrange and orient the scanned images to cause a printing engine to print the scanned images on corresponding panels according to the sheet scanning order (using a processor of the printing/scanning device). Such methods and devices print the scanned images on corresponding panels of the foldable media according to the sheet scanning order, using the printing engine of the printing/scanning device.

Figure 2:
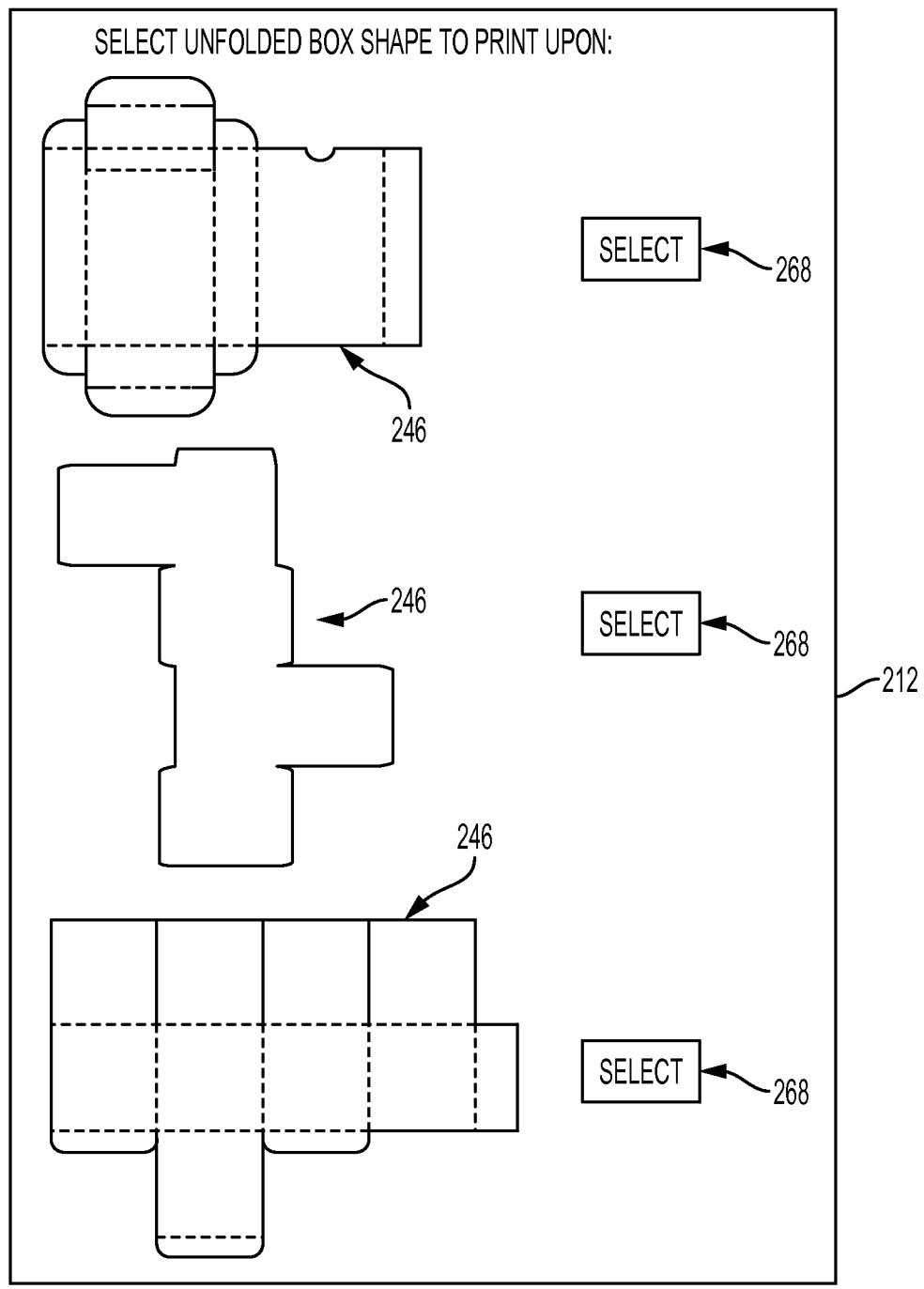
FIG. 2 is a schematic diagram illustrating a user display herein.

FIG. 1 shows the foregoing in flowchart form, and FIGS. 2-11 illustrate such processing. In item 100, these methods optionally display a menu for selection from different foldable media types or patterns, on a user interface of a self-contained printing and scanning apparatus. For example, FIG. 2 illustrates a user interface 212 of a printing and scanning device that asks the user to select an unfolded box shape to print upon, with selection buttons 268 for the different foldable media types or patterns 246. As shown in FIG. 2, each of the foldable media types 246 has different panel positions corresponding to a specific sheet scanning order. The flat foldable media has two flat sides (e.g., front and back) and multiple panels per flat side (multiple panels on the front, and multiple panels on the back). The foldable media receives printing while unfolded, and the foldable media is later folded by the user or an automated folding machine into a three-dimensional shape after the printing.

In item 102 in FIG. 1 such methods, display a sheet scanning order (corresponding to panels of the foldable media) on a user interface of the self-contained printing and scanning apparatus to instruct the user how to have scanned sheets printed on panels of the foldable media. The sheet scanning order identifies the corresponding panel of the foldable media for each position in the sheet scanning order.

Figure 3:
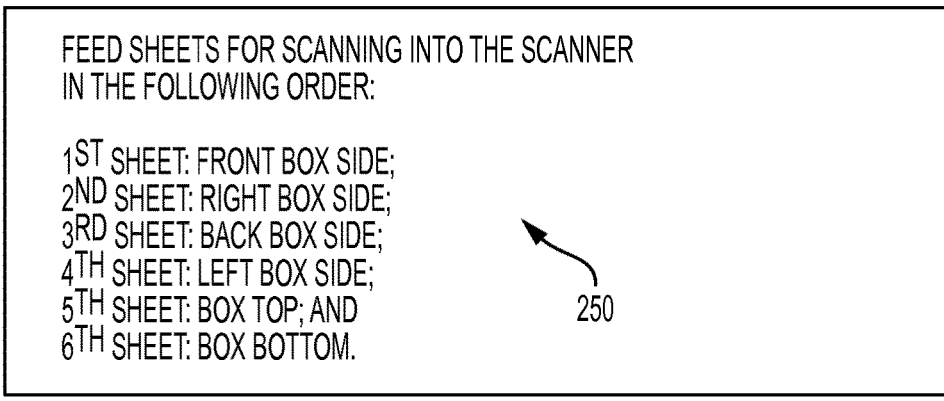
FIG. 3 is a schematic diagram illustrating a user display herein.
Figure 4:
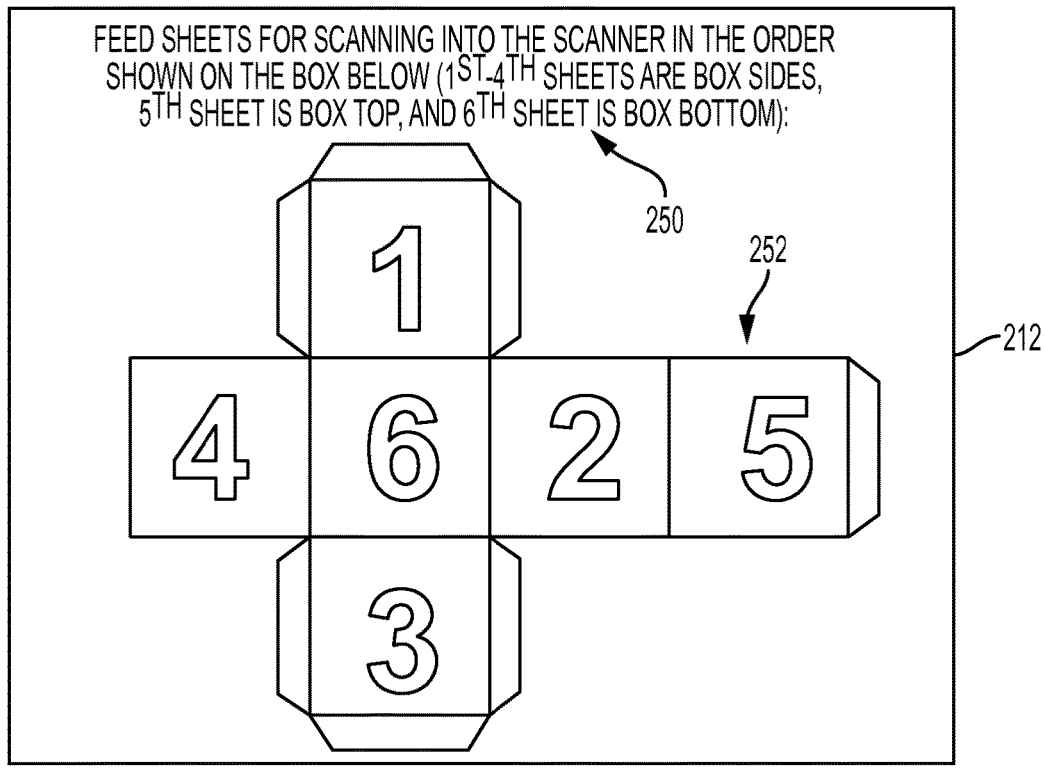
FIG. 4 is a schematic diagram illustrating a user display herein.

For example, as shown in FIG. 3, these methods can display the sheet scanning order (item 102, FIG. 1) by providing (on the user interface 212 of the printing and scanning device) text 250 that explains which sheets will appear on specific panels; or, as shown in FIG. 4 by displaying (again on the user interface 212 of the printing and scanning device) the sheet scanning order on a graphic representation of the foldable media 252 (unfolded or folded) with or without the text description 250. As can be seen in FIG. 4, the block numbers 1-6 on the graphic representation of the foldable media 252 inform the user where each scanned sheet (sheets 1-6) will be printed on the foldable media before the user performs the scanning to allow the user to organize the sheets to be scanned so that the images are printed in the user selected locations (panels 1-6) on the foldable media.

Figure 5:
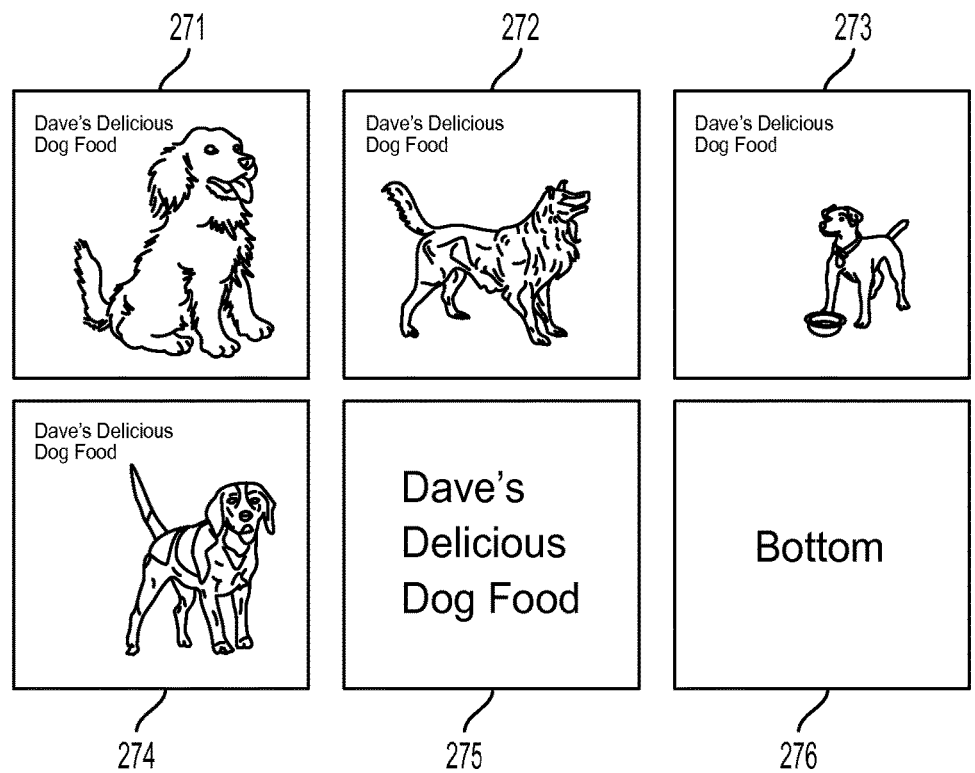
FIG. 5 is a schematic diagram illustrating printed sheets to be scanned herein.
Figure 6:
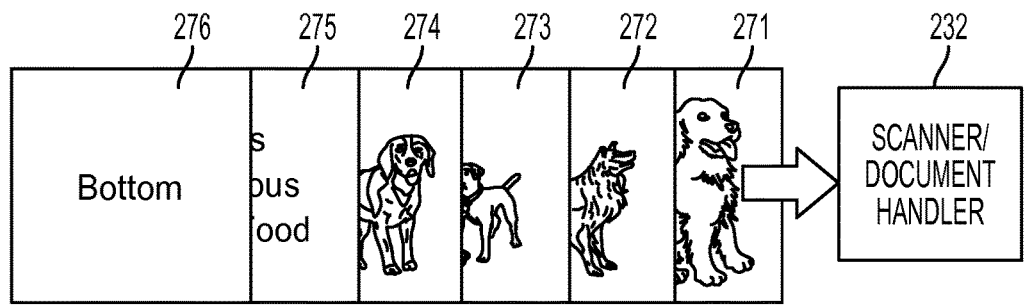
FIG. 6 is a schematic diagram illustrating printed sheets being scanned herein.

Such methods scan sheets (as arranged by the user in the sheet scanning order) to generate scanned images using a scanner of the self-contained printing and scanning apparatus, as shown in item 104. FIG. 5 illustrates item 104 in FIG. 1 by showing six exemplary existing physical printed sheets 271-276 with machine and/or human markings thereon that the user will scan, and FIG. 6 illustrates the sheets 271-276 being supplied to the scanner/document handler 232 of the printing and scanning device by the user (as shown by the block arrow in FIG. 6).

Additionally in item 106 in FIG. 1, such methods automatically arrange and orient the scanned images to cause a printing engine of the self-contained printing and scanning apparatus to print the scanned images on corresponding panels according to the sheet scanning order (using a processor of the self-contained printing and scanning apparatus). When automatically arranging and orienting the scanned images in item 106, these methods can automatically adjust the size of the scanned images to match the size of a corresponding panel, and can automatically orient the scanned images to all have the same orientation when the foldable media is folded. For example, while the printed sheets 271-276 scanned by the user are of uniform size, the panels on the foldable item may not be all the same size, and therefore the systems and methods herein automatically scale the images (increase or decrease image size) to match the size of the panel upon which an image will be printed.

In item 108 in FIG. 1, these methods can optionally display (again on the user interface of the printing and scanning device) the scanned images as arranged on a graphic representation of the foldable media (unfolded or folded). Item 108 from FIG. 1 is shown in, for example, FIG. 7 which illustrates the user interface 212 of the printing and scanning device displaying scanned images as arranged on a graphic representation of the foldable media 256 and text explaining that the user's scanned sheets will be printed on the unfolded box as shown (item 254).

Figure 7:
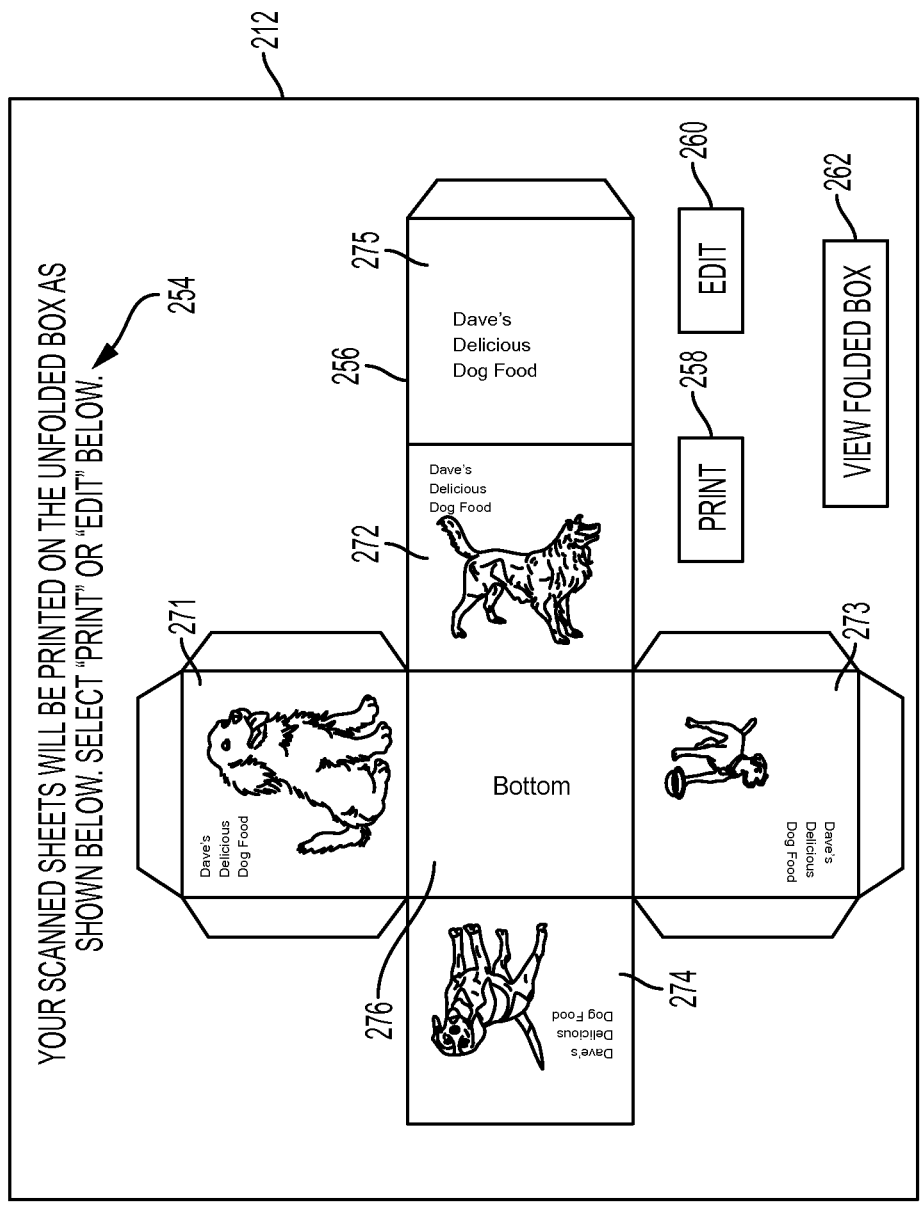
FIG. 7 is a schematic diagram illustrating a user display herein.

FIG. 7 additionally illustrates how the systems and methods herein automatically rotate the scanned images 271-276 to all have the same orientation when the foldable media is folded (as mentioned above with respect to item 106 in FIG. 1). Specifically, as shown in FIG. 7, scanned images 272, 275, and 276 are automatically arranged, sized, and rotated to have the same relative orientation, scanned image 274 is automatically arranged, sized, and rotated to have the an inverted (180°) orientation (relative to scanned images 272, 275, and 276), and scanned images 271 and 273 are automatically arranged, sized, and rotated to have opposite perpendicular (90°) orientation (relative to scanned images 272, 275, and 276). Those ordinarily skilled in the art would understand that different package shapes would utilize different automatic arrangement, sizing, and rotation of scanned images.

Further, FIG. 7 illustrates various menu options, such as print 258 and edit 260. If the user selects the edit menu option 260, they will be allowed to manually change the location, orientation, size, etc., of the scanned images 271-276 (e.g., using user interface pointer movements, drag-and-drop features, arrow keys, etc., that manipulate the images 271-276 as they appear on item 256).

Figure 8:
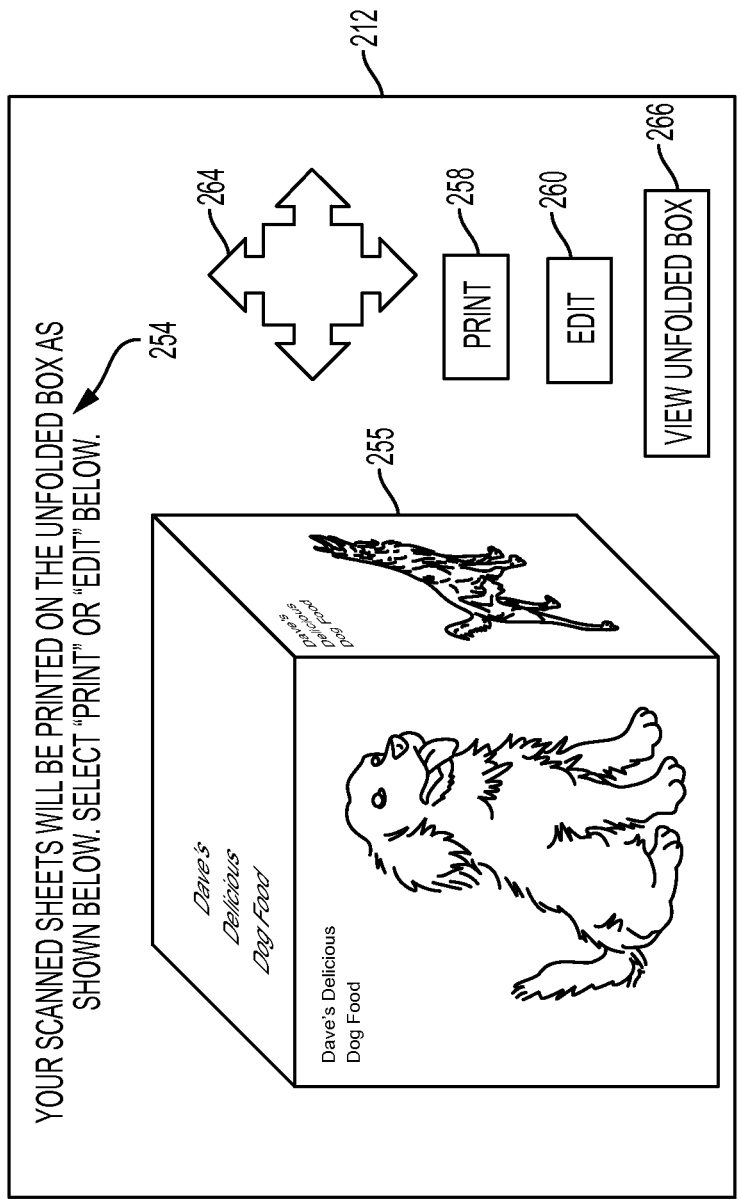
FIG. 8 is a schematic diagram illustrating a user display herein.

If the user selects the view folded box menu option 262 in FIG. 7, they are presented with the user interface screen shown in FIG. 8, which illustrates the scanned images arranged on a graphic representation of the media as it would appear folded (item 255) as well as the same print 258 and edit 260 menu options, and the text explanation 254. In addition, FIG. 8 illustrates additional menu options such as menu option 264 that provides arrows allowing the user to rotate the graphic representation of the folded media 255, and a view unfolded box menu option 266 that returns the user to the screen shown in FIG. 7.

Figure 9:
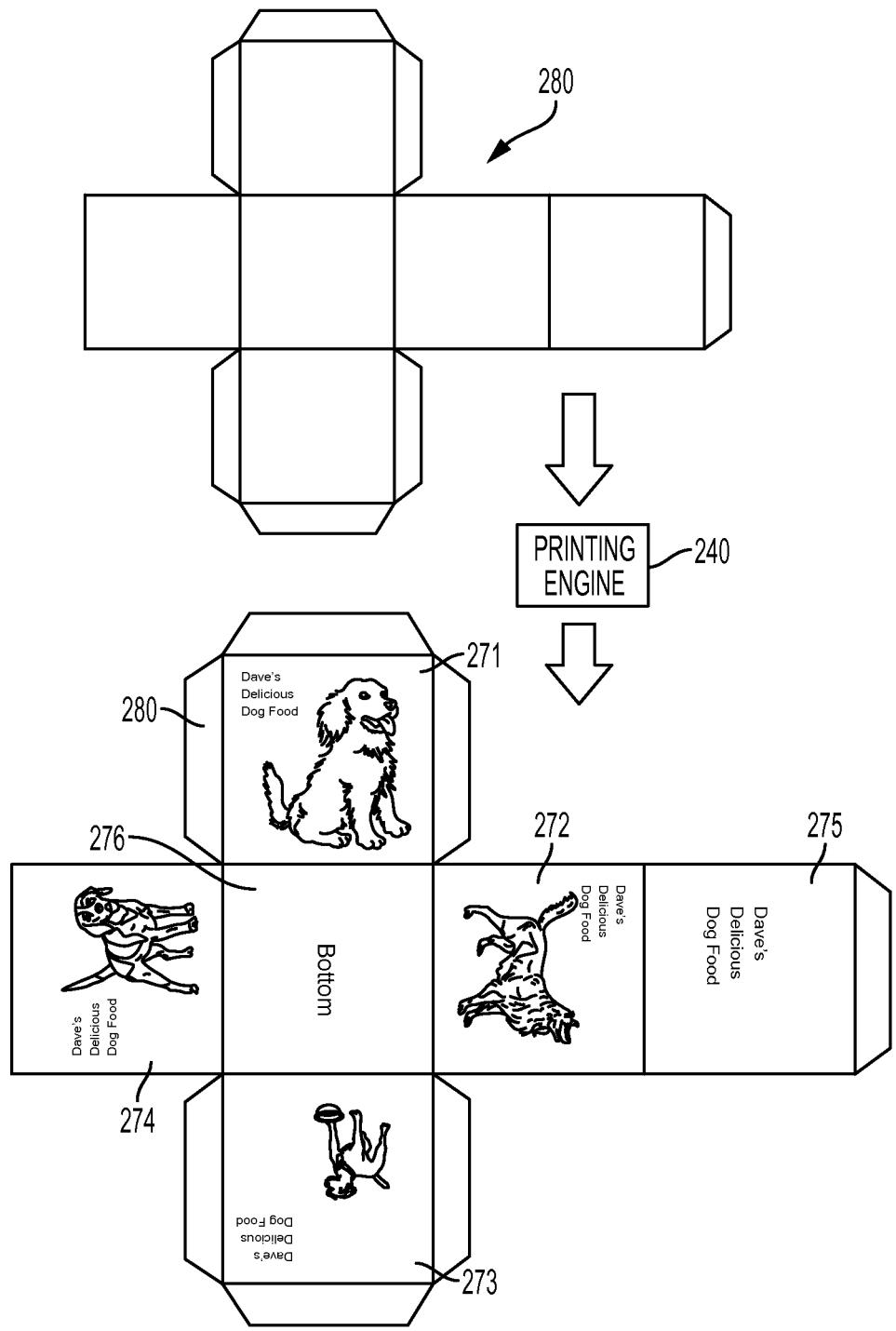
FIG. 9 is a schematic diagram illustrating printing being performed herein.

Then, these methods print the scanned images on corresponding ones of the panels of the foldable media according to the sheet scanning order, using the printing engine, as shown in item 110 in FIG. 1. The printing performed in item 110 is also shown in FIG. 9, which illustrates an unprinted, unfolded, foldable item 280 being printed upon by a printing engine 240 (of the printing and scanning device) and the resulting unfolded item 280 having the images 271-276 printed thereon. While FIG. 9 illustrates printing on one side of the foldable item 280, those ordinarily skilled in the art would understand that printing could be performed on both sides (both front and back sides) of the foldable item 280.

Figure 10:
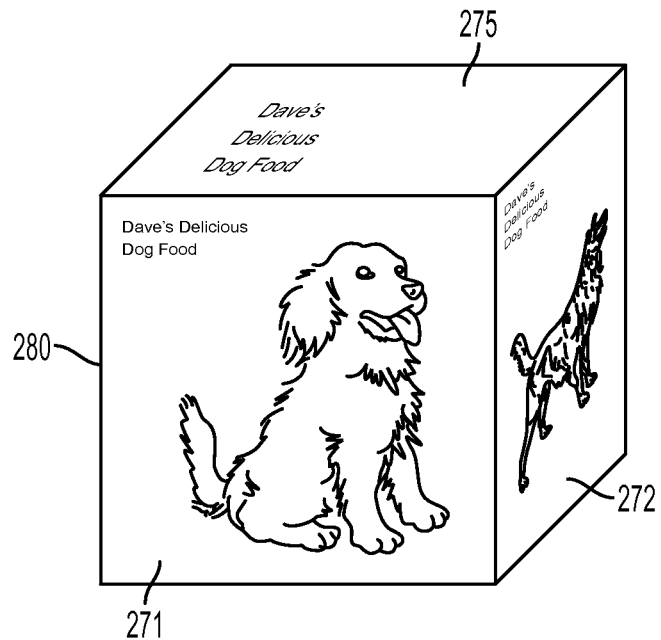
FIG. 10 is a schematic diagram illustrating folded printed items herein.
Figure 11:
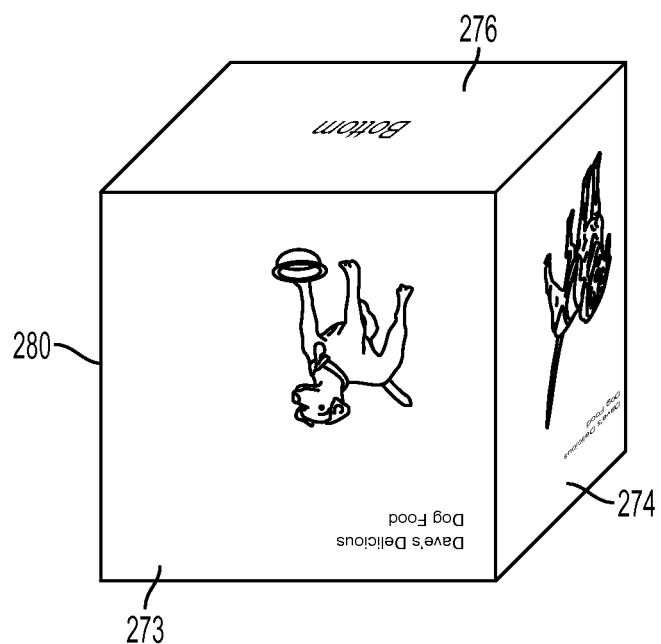
FIG. 11 is a schematic diagram illustrating folded printed items herein.

Additionally, FIGS. 10 and 11 illustrate the same printed item 280 from FIG. 9 after it has been folded into a box. More specifically, FIG. 10 illustrates a view that shows image 275 at the top of the drawing, and FIG. 11 illustrates a view that shows image 276 at the top of the drawing. As shown in FIGS. 10 and 11, the methods and devices herein orient the scanned images 271-276 to all have the same orientation when the foldable media 280 is folded.

Figure 12:
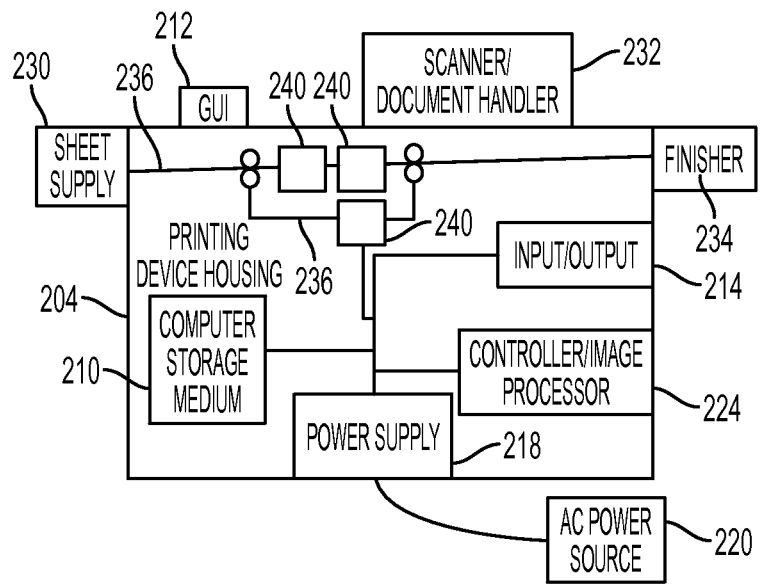
FIG. 12 is a schematic diagram illustrating devices herein.

FIG. 12 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphic user interface (GUI) assembly 212. The user may receive messages, instructions, and menu options from, and enter instructions through, the graphic user interface or control panel 212.

The input/output device 214 is used for communications to and from the printing device 204 and comprises a wired device or wireless device (of any form, whether currently known or developed in the future). The tangible processor 224 controls the various actions of the printing device 204.

A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 12, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

Therefore, as shown above, apparatuses herein include, among other components, a processor 224, a printing engine 240, a scanner 232, and a user interface 212, etc., each operatively (meaning directly or indirectly) connected to the processor 224. The printing engine prints (places markings) on foldable media. The foldable media has multiple panels per side and receives the printing while unfolded, and the foldable media is later folded into a three-dimensional shape after being printed upon. The user interface 212 displays a sheet scanning order that identifies a corresponding panel of the foldable media for each position in the sheet scanning order. The scanner 232 scans the sheets (as arranged by the user in the sheet scanning order) to generate scanned images. The processor 224 automatically arranges and orients the scanned images to cause the printing engine 240 to print the scanned images on corresponding panels, according to the sheet scanning order.

While the foregoing apparatuses can be systems that include many separate devices, other apparatuses herein are stand-alone, self-contained printing and scanning apparatuses 204 that can scan images and print such images directly on foldable media without using any other device or system (such as a package design program running on a separate computer, etc.).

Such stand-alone, self-contained apparatuses 204 include (among other components) a processor 224 and a printing engine 240 within the body of the apparatus, a scanner 232 and a user interface 212 on the exterior of the apparatus (all of which can be operatively connected to the processor) etc. The printing engine 240 prints on foldable media that has multiple panels per side. Again, such foldable media receives printing while unfolded, and the foldable media is later folded (manually or automatically) into a three-dimensional shape after printing.

The user interface 212 displays a sheet scanning order that identifies a corresponding panel of the foldable media for each position in the sheet scanning order. For example, the user interface 212 can display the sheet scanning order by providing text that explains which sheets will appear on specific panels, or by displaying the sheet scanning order on a graphic representation of the foldable media.

The scanner 232 scans the sheets (as arranged by the user in the sheet scanning order) to generate scanned images. The processor 224 automatically arranges and orients the scanned images to cause the printing engine 240 to print the scanned images on corresponding panels of the foldable media according to the sheet scanning order. The processor 224 can also automatically orient the scanned images to all have the same orientation when the foldable media is folded, and automatically adjust the size of the scanned images to match the size of a corresponding panel. The user interface 212 can further display a menu for selection from different foldable media types, each of which comprises different panel positions corresponding to a specific sheet scanning order.

Figure 13:
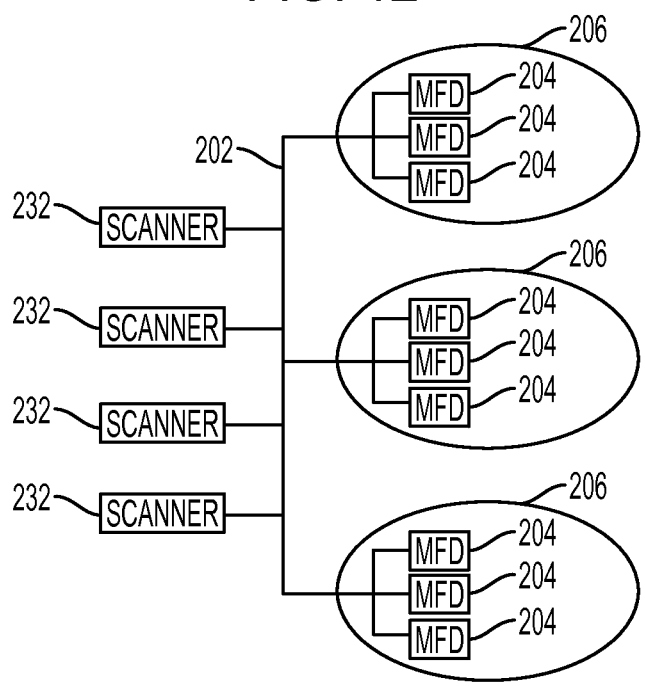
FIG. 13 is a schematic diagram illustrating systems herein.

Additionally, FIG. 13 illustrates separate scanners 232 and printing devices 204 (potentially at different physical locations 206) in communication with each other over a computerized network 202. Note that FIG. 13 only uses scanners 232 and printers 204 and still avoids the conventional process of requiring the user to first interact with a container design application running on a separate computerized device, to select and arrange images on foldable items.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a processor;
   a printing engine operatively connected to said processor, said printing engine printing on foldable media, said foldable media comprising multiple panels per side, said foldable media receiving said printing while unfolded, and said foldable media being folded into a three-dimensional shape after said printing;
   a scanner operatively connected to said processor, said scanner scanning sheets to generate scanned images; and
   a user interface operatively connected to said processor, said user interface displaying a sheet scanning order, said sheet scanning order identifying a corresponding panel of said foldable media for each position in said sheet scanning order, said user interface displaying said sheet scanning order by displaying numbers representing said sheet scanning order on panels of a graphic representation of said foldable media, and said processor automatically arranging and orienting said scanned images to cause said printing engine to print said scanned images on corresponding ones of said panels according to said sheet scanning order.

2. The apparatus according to claim 1, said processor automatically arranging and orienting said scanned images by automatically adjusting a size of said scanned images to a size of a corresponding panel.

3. The apparatus according to claim 1, said processor automatically arranging and orienting said scanned images by automatically orienting said scanned images to all have the same orientation when said foldable media is folded.

4. The apparatus according to claim 1, said user interface further displaying a menu for selection from different foldable media types, each of which comprises different panel positions corresponding to a specific sheet scanning order.

5. A self-contained printing and scanning apparatus comprising: a body;
   a processor within said body;
   a printing engine within said body and operatively connected to said processor, said printing engine printing on foldable media, said foldable media comprising multiple panels per side, said foldable media receiving said printing while unfolded, said foldable media being folded into a three-dimensional shape after said printing;
   a scanner operatively connected to said body and said processor, said scanner scanning sheets to generate scanned images; and
   a user interface operatively connected to said body and said processor, said user interface displaying a sheet scanning order, said sheet scanning order identifying a corresponding panel of said foldable media for each position in said sheet scanning order, said user interface displaying said sheet scanning order by displaying numbers representing said sheet scanning order on panel of a graphic representation of said foldable media, and said processor automatically arranging and orienting said scanned images to cause said printing engine to print said scanned images on corresponding ones of said panels according to said sheet scanning order.

6. The self-contained printing and scanning apparatus according to claim 5, said processor automatically arranging and orienting said scanned images by automatically adjusting a size of said scanned images to a size of a corresponding panel.

7. The self-contained printing and scanning apparatus according to claim 5, said processor automatically arranging and orienting said scanned images by automatically orienting said scanned images to all have the same orientation when said foldable media is folded.

8. The self-contained printing and scanning apparatus according to claim 5, said user interface further displaying a menu for selection from different foldable media types, each of which comprises different panel positions corresponding to a specific sheet scanning order.

9. A method comprising:
   displaying a sheet scanning order on a user interface, said sheet scanning order identifying a corresponding panel of a foldable media for each position in said sheet scanning order, said displaying said sheet scanning order comprising displaying numbers representing said sheet scanning order on panel of a graphic representation of said foldable media, said foldable media comprising multiple panels per side, said foldable media receiving printing while unfolded, and said foldable media being folded into a three-dimensional shape after said printing;
   scanning sheets in said sheet scanning order to generate scanned images using a scanner; automatically arranging and orienting said scanned images to cause a printing engine to print said scanned images on corresponding ones of said panels according to said sheet scanning order using a processor; and printing said scanned images on corresponding ones of said panels of said foldable media according to said sheet scanning order using said printing engine.

10. The method according to claim 9, said automatically arranging and orienting said scanned images comprising automatically adjusting a size of said scanned images to a size of a corresponding panel.

11. The method according to claim 9, said automatically arranging and orienting said scanned images comprising automatically orienting said scanned images to all have the same orientation when said foldable media is folded.

12. The method according to claim 9, further comprising displaying a menu for selection from different foldable media types on said user interface, each of said different foldable media types comprising different panel positions corresponding to a specific sheet scanning order.

13. A method comprising:
displaying a sheet scanning order on a user interface of a self-contained printing and scanning apparatus, said sheet scanning order identifying a corresponding panel of a foldable media for each position in said sheet scanning order, said displaying said sheet scanning order comprising displaying numbers representing said sheet scanning order on panel of a graphic representation of said foldable media, said foldable media comprising multiple panels per side, said foldable media receiving printing while unfolded, and said foldable media being folded into a three-dimensional shape after said printing;

scanning sheets in said sheet scanning order to generate scanned images using a scanner of said self-contained printing and scanning apparatus;

automatically arranging and orienting said scanned images to cause a printing engine of said self-contained printing and scanning apparatus to print said scanned images on corresponding ones of said panels according to said sheet scanning order using a processor of said self-contained printing and scanning apparatus; and printing said scanned images on corresponding ones of said panels of said foldable media according to said sheet scanning order using said printing engine.

14. The method according to claim 13, said automatically arranging and orienting said scanned images comprising automatically adjusting a size of said scanned images to a size of a corresponding panel.

15. The method according to claim 13, said automatically arranging and orienting said scanned images comprising automatically orienting said scanned images to all have the same orientation when said foldable media is folded.

16. The method according to claim 13, further comprising displaying a menu for selection from different foldable media types on said user interface, each of said different foldable media types comprising different panel positions corresponding to a specific sheet scanning order.

\* \* \* \* \*